(12) United States Patent
Kawakami

(10) Patent No.: US 6,307,564 B1
(45) Date of Patent: Oct. 23, 2001

(54) PICTURE DISPLAY METHOD AND APPARATUS

(75) Inventor: Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/419,325

(22) Filed: Oct. 15, 1999

Related U.S. Application Data

(62) Division of application No. 08/658,506, filed on Jun. 5, 1996, now Pat. No. 6,028,609.

(30) Foreign Application Priority Data

Jun. 16, 1995 (JP) .................................................. 7-150763

(51) Int. Cl.[7] .................................................. G06T 17/00
(52) U.S. Cl. .................................................. 345/474
(58) Field of Search ................................ 345/418, 419, 345/473, 474

(56) References Cited

U.S. PATENT DOCUMENTS

| | | | |
|---|---|---|---|
| 4,580,782 | * 4/1986 | Ochi | 273/1 |
| 5,310,349 | * 5/1994 | Daniels et al. | 434/350 |
| 5,546,943 | * 8/1996 | Gould | 128/653.1 |
| 5,577,961 | * 11/1996 | Adamczyk et al. | 345/419 |
| 5,588,914 | * 12/1996 | Adamczyk | 345/419 |
| 5,644,694 | * 7/1997 | Appleton | 345/474 |
| 5,689,669 | * 11/1997 | Lynch et al. | 395/355 |
| 5,751,289 | * 5/1998 | Myers | 345/419 |
| 5,790,950 | * 8/1998 | Suzuki et al. | 345/427 |

* cited by examiner

Primary Examiner—Cliff N. Vo
(74) Attorney, Agent, or Firm—Oblon, Spivak, McClelland, Maier & Neustadt, P.C.

(57) ABSTRACT

A method and apparatus for displaying a three-dimensional picture is disclosed. The picture display apparatus includes a display device for displaying a three-dimensional picture, a pointing device for pointing a position in the picture displayed in the display device, a holding device for holding the control information of a plurality of possible stop points pre-determined in a three-dimensional space, and a control device for causing the three-dimensional picture to be displayed on the display device based on the control information of the possible stop points in the three-dimensional space held by the holding device. The possible stop points correspond to positions in the picture pointed by the pointing device. The producer of a virtual reality can easily reflect the intention of a three-dimensional virtual reality, while the-user can easily walk in the three-dimensional virtual reality.

19 Claims, 9 Drawing Sheets

PICTURE DISPLAY METHOD AND APPARATUS

RELATED APPLICATION

This is a divisional application of application No. 08/658,506 filed on Jun. 5, 1996, now issued as U.S. Pat. No. 6,028,609.

BACKGROUND OF THE INVENTION

1. Field of the Invention

This invention relates to method and apparatus for displaying a three-dimensional picture.

2. Description of Related Art

A server computer, as a central information processing apparatus, and a client computer, as a user terminal information processing apparatus, maybe interconnected using a cable, a telephone line or a network, for purveying the information in the server computer to the user client computer, or retrieving the information in the server computer from the user client computer, It is recently practiced to represent the virtual reality three-dimensionally, as a conceptual model or metaphoric representation for information purveying services on a display device of the client computer which is capable of displaying graphics. Thus the user is able to use or retrieve the information purveying services in a form similar to reality.

Specifically, a variety of objects or equipments, such as desks, shelves, television receivers or doors, exist in the virtual reality. The user points the direction of movement in the three-dimensional virtual reality, using a pointing device, such as a mouse, trackball or a keypad, and moves within the displayed three-dimensional virtual reality for acting on the objects or the equipments within the three-dimensional virtual reality.

When the user moves in the three-dimensional virtual reality, he or she is free to move in an optional direction. Thus it is difficult for the user to realize in which direction he or she is to move or which objects or equipments will be encountered.

On the other hand, since the three-dimensional virtual reality is represented on a two-dimensional display device, that is a CRT display, it is difficult to reflect the intention of a producer who has produced the three-dimensional virtual reality.

If the user has moved to a position in the three-dimensional virtual reality not intended by the producer, the field of view of the user becomes incomprehensible such that he or she is unable to realize in which direction he or she is to move next.

SUMMARY OF THE INVENTION

It is therefore an object of the present invention to provide a picture display method and apparatus in which the user feels free to move and it is possible to represent a picture of the three-dimensional virtual reality so as to reflect the intention of the producer.

In one aspect, the present invention provides a picture display apparatus including display means for displaying a three-dimensional picture, pointing means for pointing a position in the picture displayed in the display means, holding means for holding the control information of a plurality of possible stop points pre-determined in a three-dimensional space, and control means for causing the three-dimensional picture to be displayed on the display means based on the control information of the possible stop points in the three-dimensional space held by the holding means. These possible stop points correspond to positions in the picture pointed by the pointing means.

In another aspect, the present invention provides a picture display method including displaying a three-dimensional picture on a display device and displaying the three-dimensional picture on the display device based on the control information on predetermined possible stop points in a three-dimensional space corresponding to positions in the picture pointed by pointing means adapted for pointing a position in the picture.

According to the present invention, if a pre-set position in a picture displayed on a display device is pointed to by a pointing device, the control device manages control for displaying a three-dimensional picture on the display device based on the position information, line of sight information, speed information and the operational information of the possible stop points pre-set in association with the pointed to position. The information of these various sorts are held by the holding device. The inside of the three-dimensional virtual reality may be displayed easily, while the user can easily walk through the inside of the three-dimensional virtual reality.

In addition, the producer of the three-dimensional virtual reality can easily reflect the intention of production with a smaller data volume. Since the operation of the human being in the three-dimensional virtual reality can be assimilated to the operation of the human being in the real world, the user can easily move through the inside of the three-dimensional virtual reality so that the picture seen during such movement can be rendered analogous to a picture as encountered during movement of a human being in the real world.

DESCRIPTION OF THE PREFERRED EMBODIMENTS

Figure 1:
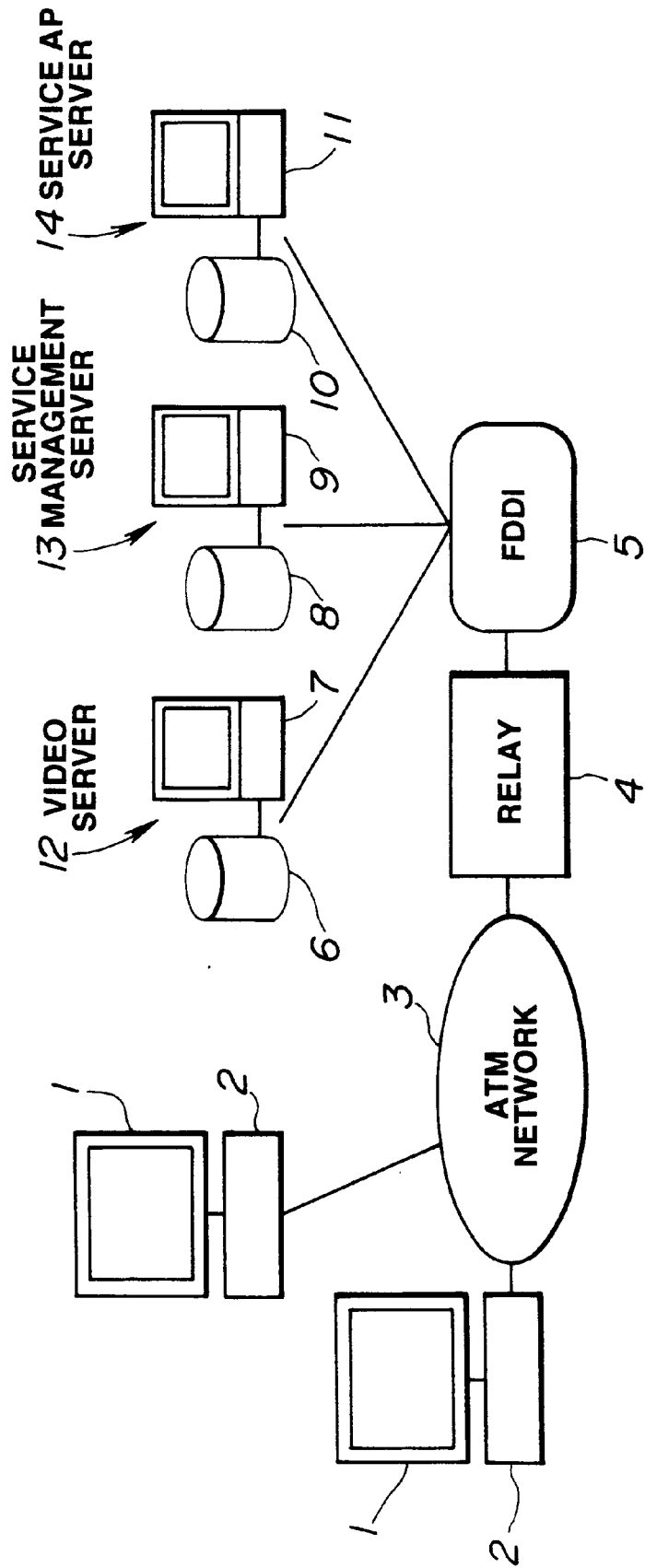
FIG. 1 is a schematic view showing an arrangement of a system inclusive of a client computer having a picture display apparatus according to the present invention.

Referring to the drawings, preferred embodiments of the present invention will be explained in detail.

Before proceeding to a description of the illustrative contents of the present invention, the overall system inclusive of the picture display apparatus according to the present invention will be explained by referring to FIGS. 1 and 2.

In the system of the present embodiment, an on-line terminal device 2, which is an information processing apparatus according to the present invention, as a client computer, is connected via a large-scale ATM (asynchronous transmission mode) network 3, a relay 4, and a fiber distribution data interface (FDDI) 5, to a service management server 13, a video server 12 and a service AP server 14, which are service purveying side on-line servers, as shown in FIG. 1. The asynchronous transmission mode (ATM) divides the transmission data into plural fixed-length data, that is plural 48-byte-based data, irrespective of data types, and appends a 5-byte header, inclusive of the information on the address of the destination of data transmission, to the fixed-length data, in order to transmit data in terms of data units called "cells" each made up of 53 bytes. These cells, fed into the ATM network 3, are switched by the ATM switcher based on the header information. On arrival at the receiving terminal, the cells are restored to the original data based on the header information. The ATM network can transmit speech, moving pictures and computer data in admixture. The FDDI is a medium accessing system of a 100 Mbit/second token passing system employing optical fibers.

The video server 12 is comprised of a data storage device 6, made up of the server computer 7 and a data storage device 6, such as a hard disc or an optical disc. In the data storage device 6 is stored digital video data processed into a format, such as MPEG format as later explained. The digital video data is read out from the data storage device 6 of the video server 12 for transfer in response to a request from the client computer 2.

The service AP server 14 is similarly comprised of a server computer 11 and a data storage unit 10. In the data storage unit 10, data or scripts which form the basis of a three-dimensional picture as application (AP) program data is stored. From the data storage device 10 of the service AP server 14, the application program data is read out for transfer in response to the request from the client computer 2.

The service management server 13 is similarly comprised of a server computer 9 and a data storage device 8. The service management server 13 accepts requests from the client computer 2 and controls or manages the video server 7 or the service AP server 11 in response to the requests.

It is possible to provide plural video servers 12 and plural service AP servers 14, or to assemble the servers 12 to 14 in a single server.

The requests transferred through the ATM network 3 are transmitted to a server via a device for doing protocol conversion, termed relay 4, relay 4 performs automatic data distribution and data transfer speed conversion, and via the FDDI interface 5.

The data sent from the server in response to the requests from the client computer 2 is processed for display by the client computer 2 so as to be displayed on the display of the monitor. This completes a graphical user interface (GUI), that is a user interface employing the graphic display. Thus the user may operate or receive services as he or she views the graphic display on the monitor device 1.

Figure 2:
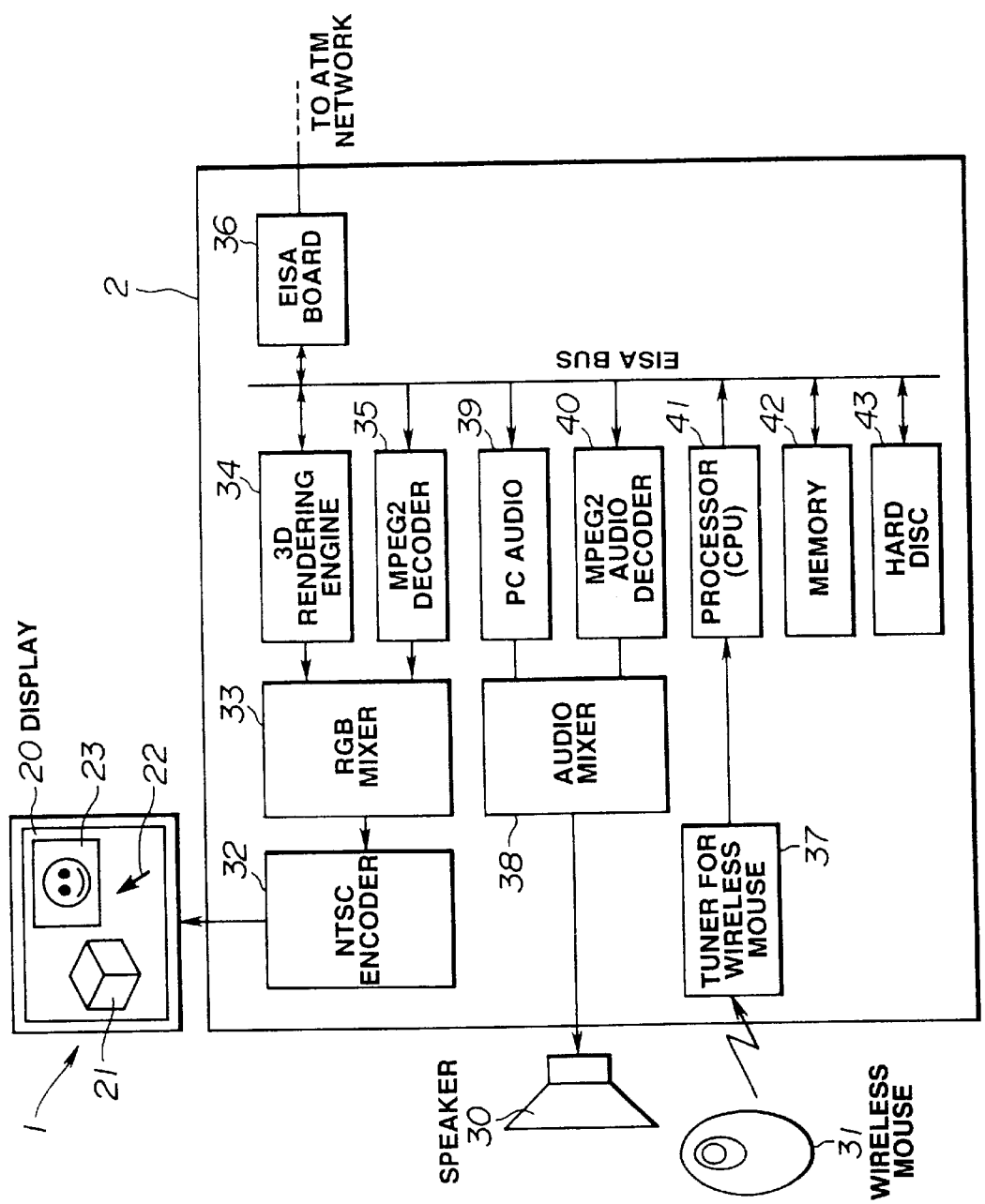
FIG. 2 is a schematic view showing an arrangement of a client computer having a picture display apparatus according to the present invention.

The client computer 2 shown in FIG. 1 is arranged as shown in FIG. 2.

Referring to FIG. 2, the EISA board 36 is a board for communication which interconnects the client computer 2 and the ATM network 3. The signals supplied from the ATM network 3 to the EISA board 36 are transiently stored in the hard disc 43 which is controlled as to data reading and data writing by the processing unit 41. The signals are then read out depending on data sorts and supplied to the three-dimensional rendering engine 34, MPEG2 decoder 35, PC audio decoder 39 and to the MPEG2 audio decoder 40.

The 3D rendering engine 34 is a coordinate converter for converting three-dimensional coordinate data of a three-dimensional object into data for display on the display 20 of the monitoring device 1. That is, three dimensional coordinate data is turned into picture data in the three-dimensional virtual reality. That is, the 3D rendering engine 34 is designed to construct the graphical user interface (GUI) conforming to the application.

The MPEG2 decoder 35 is a decoder for expanding data compressed by the MPEG2 standard. Meanwhile, MPEG (Moving Picture Experts Group) 2 is an international standard for the technique of compression and expansion of moving pictures.

Since data from the 3D rendering engine 34 and data from the MPEG2 decoder 35 are both data of three prime colors of red (R), green (G) and blue (B), the RGB mixer 33 generates data which is a mixture of these three colors R, G and B.

The NTSC encoder 32 converts data from the RGB mixer 33 into signals of the television standards of NTSC (National Television System Committee) system. The video signals from the NTSC encoder 32 are displayed on the display 20 of the monitoring device 1. On the display 20 in the present embodiment, shown in FIG. 2, there are displayed the pointer (cursor) 22 by the pointing device, a picture 23 obtained on decoding MPEG2 data and a picture for GUI produced by the 3D rendering engine 34, such as the three-dimensional or two-dimensional picture 21. The picture from the MPEG2 and the picture for GUI may be synthesized for display.

The PC audio decoder 39 generates, for example, the effect sound, using an ADPCM (adaptive differential pulse code modulation) sound source. The MPEG2 audio decoder. 40 expands audio data compressed by MPEG2. The data from the PC audio decoder 39 and the data from the MPEG2 audio decoder 40 are mixed by the audio mixer 38 into audio signals which are sent to a speaker 30. The output sound from the speaker 30 is preferably stereo sound or multi-channel sound. Use may be made of a recently developed system in which a sound image may be three-dimensionally fixed by controlling the phase difference of the stereo sound.

The operation on the display 20 employing GUI is executed using the pointing device, for example, a wireless air mouse 31. The coordinate data transmitted by a radio route by electrical waves from the wireless air mouse 31 is received by a wireless tuner 37. The received coordinate data is sent to the processing unit 41. The pointing device 31 may also be a usual mouse, trackball, joystick or a touch panel associated in the coordinate positions thereof with the display 20, in place of the wireless air mouse 31. Of course, a variety of pointing devices, such as usual mouse, trackball, keypad, joystick or a touch panel, having coordinate positions corresponding in coordinate positions to the display, may also be provided as data entry means for the pointing device 31.

The processing unit 41 has a central processing unit (CPU), and controls various component elements over a bus based on program data stored in the program ROM of the memory 42 having the function of both the program ROM and the work RAM. The processing unit also controls the GUI based on coordinate data from the wireless air mouse 31 and occasionally executes the communication with the server computer. Although the 3D rendering engine 34 and the MPEG2 decoder 35 are provided as independent chips in the embodiment of FIG. 2, signal processing by these components may also be performed by software on the above processing unit 41.

The illustrative operation of on-line service purveying to the user by using the system of FIGS. 1 and 2 is now explained.

The user first instructs connection on the network of the client computer 2 to the server computer, herein the computer 9 of the service management server 13, using the pointing device of the client computer 2.

When the connection on the network is completed and the request is supplied from the client computer 2, the computer 9 of the service management server 13 on the server side is responsive to the request to control the video server 12 and the service AP server 14 to transfer data and software to the client computer 2. The data and software, thus transferred, are those required for processing, and may be enumerated by scripts stating the behavior of the virtual reality space, three-dimensional coordinate data and sound data in the virtual reality space and scripts stating alternatives instructed from the client computer 2 to the user.

The client computer 2 presents the virtual reality space, derived from the data and the software received from the server side, using the screen of the display 20 of the monitor device 1 and occasionally the speaker 30.

The user strolls in the inside of the virtual reality space presented on the client computer 2, as he or she views the virtual reality space and instructs the direction of movement and so forth. The user also operates on a component or installation in the virtual reality space by actuating an operating button or the like provided on the pointing device.

The client computer 2 is responsive to the user actuation by the viewing point position, viewing line direction, speech and the operation or behavior of the components in the virtual reality space in accordance with the scripts, and presents the virtual reality space to the user, with the aid of the speaker 30 and the display 20 of the monitoring device 1, as though the user were present in the virtual reality space. The client computer 2 is also responsive to the statement of the scripts to present a variety of information items or give advice to the user or place an order for the user.

The picture display apparatus according to the present invention is provided in the above-mentioned client computer 2, and includes the monitoring device 1, as display means for displaying a three-dimensional picture, the wireless mouse 31 as pointing device for indicating a position in the picture displayed on the monitoring device 1, and holding means for holding the information on the positions of plural possible pre-set stop points in a three-dimensional space, the information on the line of sight, the information on the speed and the information on the operation. The picture display apparatus also includes the processor 41, as control means for controlling the monitor device 1 to display the three-dimensional picture on the monitoring device 1. The picture display apparatus displays the three-dimensional picture based on the information on the positions of plural possible pre-set stop points in a three-dimensional space, the information on the line of sight, the information on the speed and the information on the operation in the three-dimensional space, held by the holding means, in association with the positions in the picture as pointed by the wireless mouse 31. The holding means is the hard disc 43 or a memory 42. If the above information of various sorts is transmitted from the server, and are not stored on the hard disc 43 or in the memory 42, the holding means correspond to the data storage units 6, 8 and 10.

In order to permit the user to move in the three-dimensional virtual reality displayed by the above picture display apparatus, plural points are pre-set in which the user is allowed to dwell in the three-dimensional virtual reality. These plural points are termed dwell points. By actuating the wireless mouse 31 and pointing to a desired position or object in the picture representing the three-dimensional virtual reality, the user may move to and dwell at one of the dwell points in the three-dimensional virtual reality. By moving through plural dwell points, the user may move through the inside of the three-dimensional virtual reality. The picture viewed by the user as he or she moves through the inside of the three-dimensional virtual reality is displayed on the picture display apparatus.

Figure 3A:
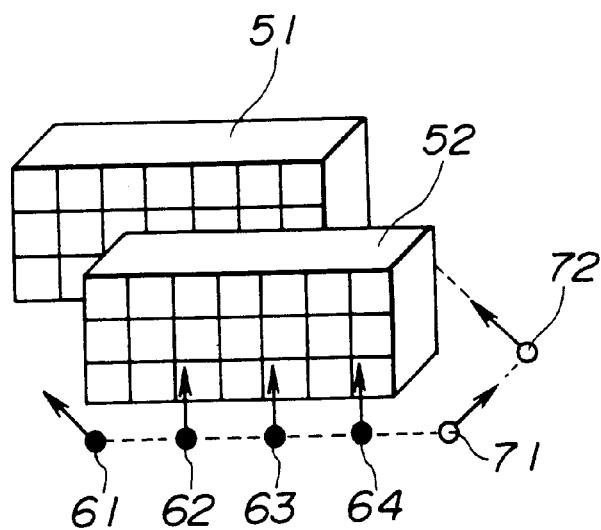
FIGS. 3A and 3B illustrate dwell points and pass points.
Figure 3B:
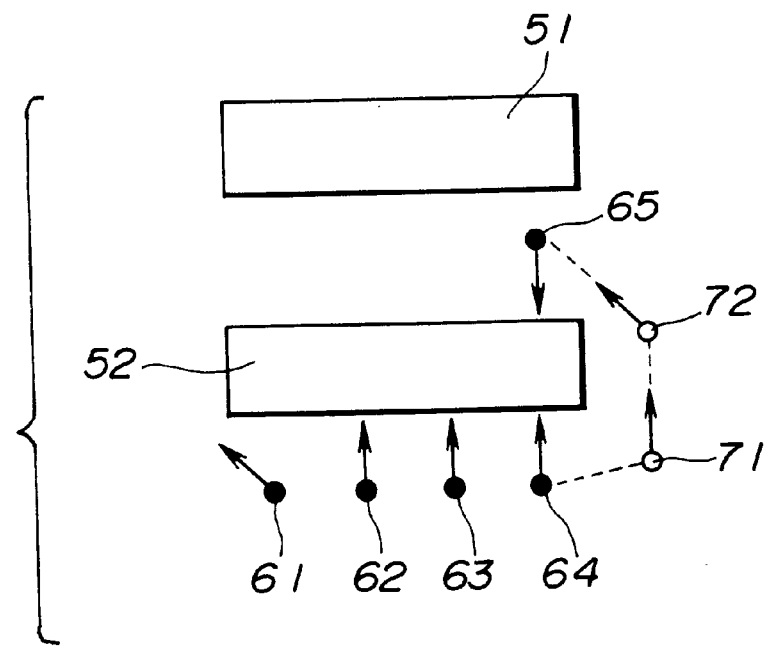

Referring to FIGS. 3A and 3B, the dwell points are explained in detail.

FIGS. 3A and 3B show a three-dimensional picture looking at shelves 51, 52 for commercial products in a store in the three-dimensional virtual reality from the oblique transverse direction and from above, respectively. FIGS. 3A and 3B also show plural dwell points 61 to 65 by black circles, movable relative to the shelves for products 51 and 52 in the store. The direction of the lines of sight of the user at these dwell points 61 to 65 are indicated by solid-line arrows.

When the user moves from a given dwell point to another dwell point, the dwell point to which the user can move is determined as the operational information of the dwell point, as will be explained subsequently. That is, the user can move only to the dwell points to which the user can move next based on the information on operation set at the given dwell point. However, the user cannot move to any other points, that is to any places where the dwell points are not provided in the three-dimensional virtual reality. For example, the user at the dwell point 62 can move only to the dwell points 61 or 63.

There are occasions wherein pass points, that is points to be passed through, are set between two dwell points. The pass points are the points indicating the positions to be passed through during movement between two dwell points, and also indicating the directions of the lines of sight. The user cannot stop at these pass points even on indication by the wireless mouse 31 and can only pass through these points. When moving from the dwell point 64 to the dwell point 65 or from the dwell point 65 to the dwell point 64 in the store of the three-dimensional virtual reality, the user must necessarily pass through the pass points 71 and 72. Plural control information items are set in these pass points 71, 72, as in the dwell points. The directions of the lines of sight of the user in these pass points 71, 72 are indicated by solid-line arrows in FIGS. 3A and 3B.

The control information items set in the dwell points and in the pass points include the position information, line of sight information, speed information and operational information. The position information is the values of the position in a three-dimensional coordinate system. The line of sight information includes the direction of the line of sight, rolling angle of the line of sight, and the visibility angle. The speed information includes the maximum value of the movement speed, maximum value of the rotational angular velocity of the direction of line of sight, maximum value of the rotational angular velocity of the rolling angle of the line of sight, and the maximum value of the increasing velocity of the angle of visibility. The operation information includes the state of the operation to be performed next.

The rolling angle corresponds to an angle of rotation when an airplane, for example, gyrates in a three-dimensional space. The operational information is written in scripts and is specifically the operation produced by the user actuating the wireless mouse 31 for moving the pointer, pointing to the position or object and clicking the button within a picture viewed by the user stopped at a dwell point. The operation information is such information for permitting the user to move to the next dwell point or open the door to enter the store in the three-dimensional virtual reality.

Since it is possible that plural dwell points or pass points have the same information items, pre-set values (default values) may be provided for respective information items. If the information at a given dwell point or at a given pass point is the same as the information at a dwell point or pass point to which the user moves next, the information at the given dwell point or at the given pass point may be inherited so as to be directly used as the information for the dwell point or pass point to which the user moves next.

Meanwhile, the points in the three-dimensional virtual reality other than the dwell points and the pass points (inner points) and the position information and line of sight information at the inner points are found by interpolation of the information at the neighboring dwell points and pass points.

During movement from a given dwell point or a given pass point to the next dwell point or pass point, the speed information set in the given dwell point or pass point is used. As for position movement, the movement occurs linearly at a constant speed not exceeding the maximum value of the movement speed. As for the direction of line of sight, rotation occurs at a constant speed not exceeding the maximum value of the rotational angular velocity. As for the rolling angle of the line of sight, rotation occurs at a constant speed not exceeding the maximum value of the rotational angular velocity of the rolling angle of the line of sight. Finally, as for the angle of visibility, it is increased at a constant rate not exceeding the maximum value of the rate of increase of the angle of visibility.

By interpolation of the inner points and the position information and line of sight information at these inner points, it becomes possible to smooth the display of the movement operation from a given dwell point or a given pass point to the next dwell point or the next pass point. That is, the picture displayed on the display unit 20 becomes analogous in picture quality to the picture viewed by the user on actual movement.

The movement and the line of sight of the user with the use of the dwell and pass points are now explained specifically.

Figure 4:
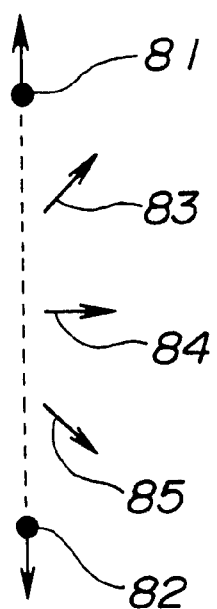
FIGS. 4A and 4B illustrate the user's operation and viewing point.
Figure 4:
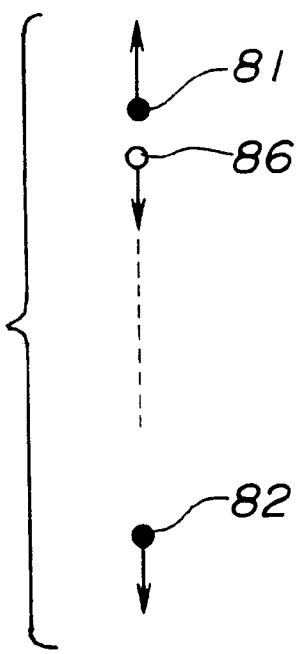

It is assumed that the user moves from a dwell point 81, the direction of line of sight for which is as indicated by a solid-line arrow in FIG. 4A, to a dwell point 82, the direction of line of sight for which is set as shown by a solid-line arrow, that is 180 opposite to that at the dwell point 81. The change in the line of sight, in which the direction of line of sight is moved at a constant rate in the sequence of solid-line arrows 83, 84 an 85, is different from the change in the line of sight of the human being in the real world. Thus a pass point 86, for which the direction of line of sight is set so as to be the same as that of the direction of the line of sight at the dwell point 82, is provided in the vicinity of the dwell point 81, as shown in FIG. 4B. Thus, if the user moves from the dwell point 81 to the dwell point 82, the direction of the line of sight is set at the pass point 86 so as to be the same as that at the dwell point 82, after which movement occurs to the dwell point 82. The movement of the line of sight occurs based on the speed information set at the dwell point 81.

By passing through the pass point 86 in moving from the dwell point 81 to the dwell point 82, the user first turns round before starting walking, thus simulating the operation of the human being in the three-dimensional virtual reality. The displayed picture becomes more analogous to the picture viewed by the human being in the actual world.

Figure 5A:
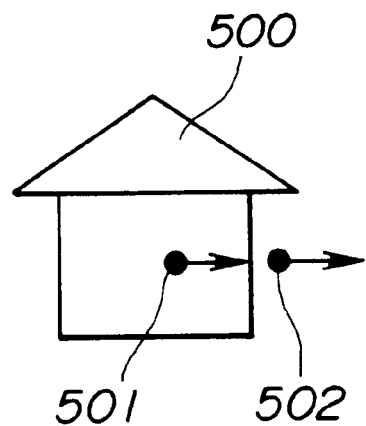
FIGS. 5A, 5B and 5C illustrate viewing angles.
Figure 5B:
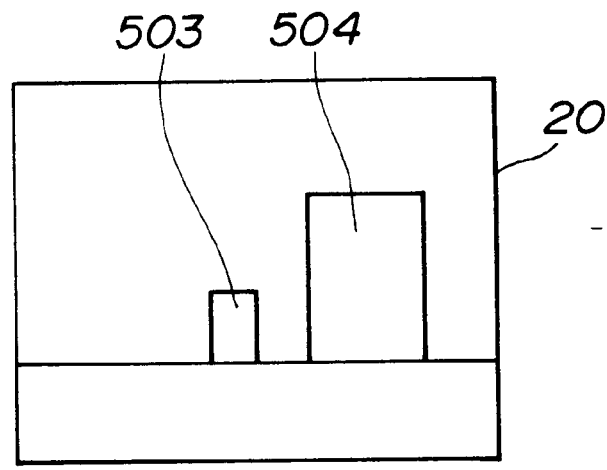
Figure 5C:
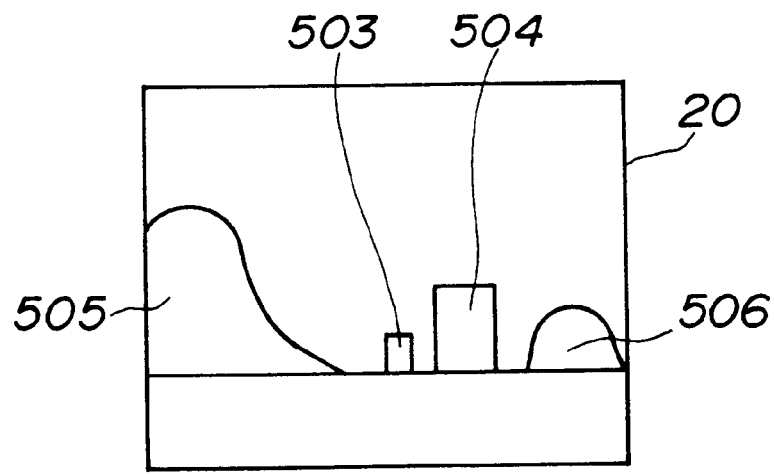

The angle of visibility may be set from one dwell point to another. By changing the angle of visibility, it becomes possible to change the amount of the information included in the picture of the same size. When the human being moves from within a house 500 to outdoors, as shown in FIG. 5A, the angle of visibility at a dwell point 502 is set so as to be wider than that at a dwell point 501. In this manner, the picture viewed by the user, that is the picture displayed on the display 20, at the dwell point 501, is a picture including buildings 503 and 504 shown in FIG. 5B. However, the picture viewed by the user on movement to the dwell point 502 is such a picture in which the perspective feeling is accentuated such that the buildings 503, 504 become smaller and mountains 505, 506 are also visible, thus representing the open outdoor feeling, as shown in FIG. 5C.

The information on picture data representing the three-dimensional virtual reality, dwell point and pass points is sent from the server of FIG. 1 via an ATM network 3 to the client computer 2. The processor 41 of the client computer controls the user movement in the three-dimensional virtual reality based on the information on the dwell and pass points, and causes the picture from the viewing points of the moving user to be displayed on the display 20. The information on the dwell and pass points, sent from the server, is recorded on the hard disc 43 or stored in the memory 42.

A first embodiment of the operation and the line of sight of the user in the three-dimensional virtual reality is explained in detail.

Figure 6:
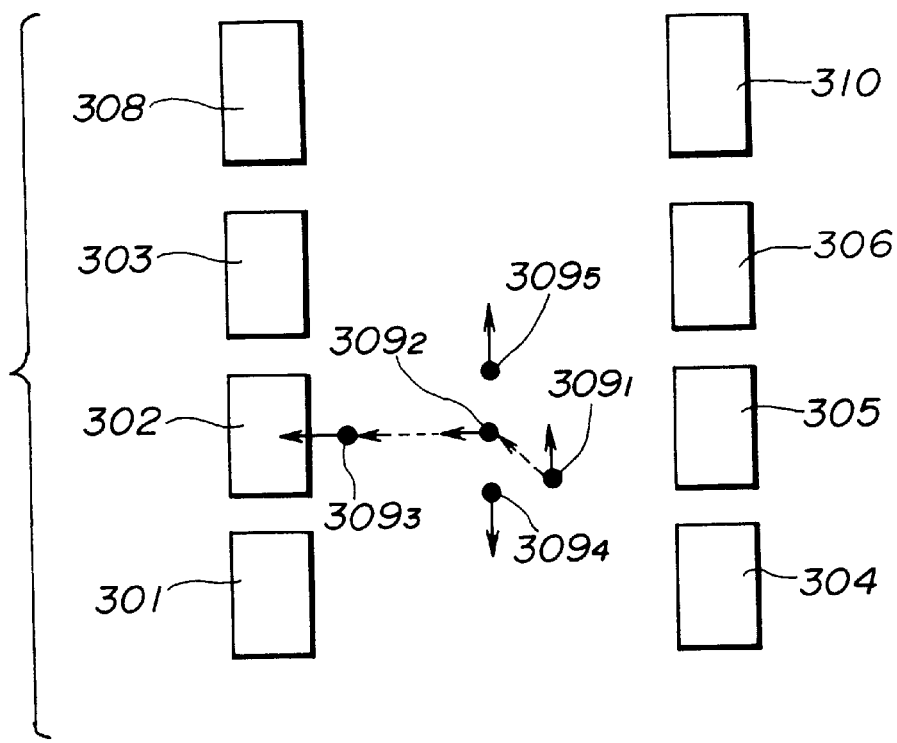
FIG. 6 illustrates a first embodiment of the user's operation and viewing point in the three-dimensional virtual reality.

FIG. 6 shows a two-dimensional picture looking into a given three-dimensional virtual reality from above. In this three-dimensional virtual reality, there are plural stores 301 to 306, 308 and 310, from which to obtain a variety of information purveying services, on both sides of the user, who walks straight between the plural stores.

It is assumed that the user is at a standstill at a dwell point $309_1$. The directions of the line of sight of the user is indicated by a solid-line arrow, while the movement operation of the user is indicated by a broken line arrow.

Figure 7:
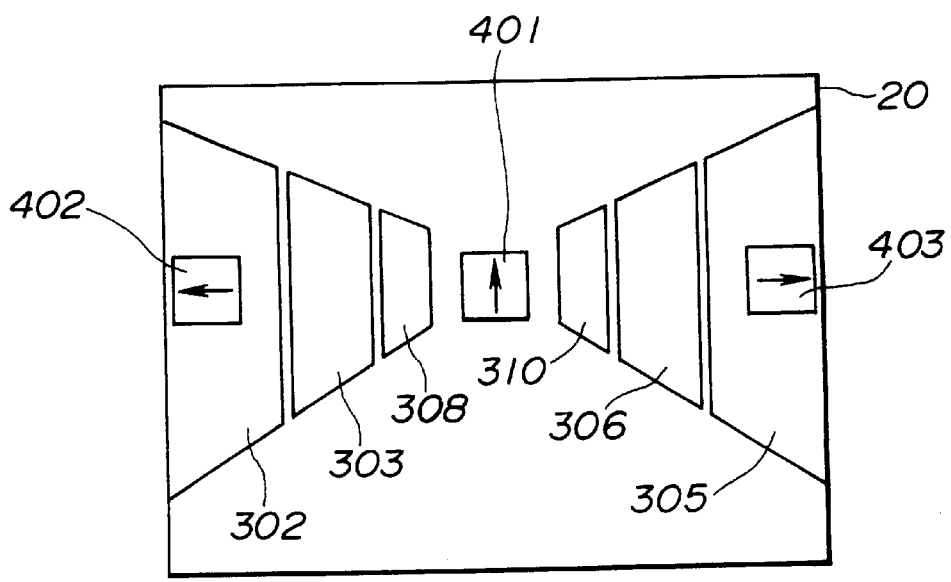
FIG. 7 shows a picture viewed by the user.

At this dwell point $309_1$, the user can move in any one of the forward, left and right directions. The picture viewed by the user at the dwell point $309_1$ is displayed on the display 20. This picture is shown in FIG. 7. The user sees left-hand side stores 302, 303, 308 and right-hand side stores 305, 306, 310.

The pointer is changed in shape or pattern depending on the position it occupies in the picture displayed on the display 20 and specifies the operation that can be done next by its position. That is, the pointer performs navigation by the pointer shape with regard to the operation to be done at the position of the pointer. Thus, by clicking the button of the wireless mouse 31 when the pointer is at a position in the display 20, the operating state indicated by the pointed shape is entered.

That is, by moving the pointer to a pre-set area and clicking the button of the wireless mouse 31, the next operation is performed under control by the processor 41 based on the operation information at the dwell point. By such operation, the picture viewed by the user is displayed on the display 20. It should be noted that the area in the picture in which the button of the wireless mouse 31 can be clicked is predetermined, such that, if the pointer moved to an area other than such predetermined area is clicked, the next operation is not entered by control of the processor 41.

In the picture of FIG. 7, the user can perform the next operation if he or she moves the pointer to one of the positions indicated by the forward arrow pointer 401, left arrow pointer 402 and the right arrow pointer 403 and clicks the button of the wireless mouse 31. The pointer shape at each position specifies the operation to be performed next at each position, that is, movement in the forward direction, towards left or towards right.

Figure 8:
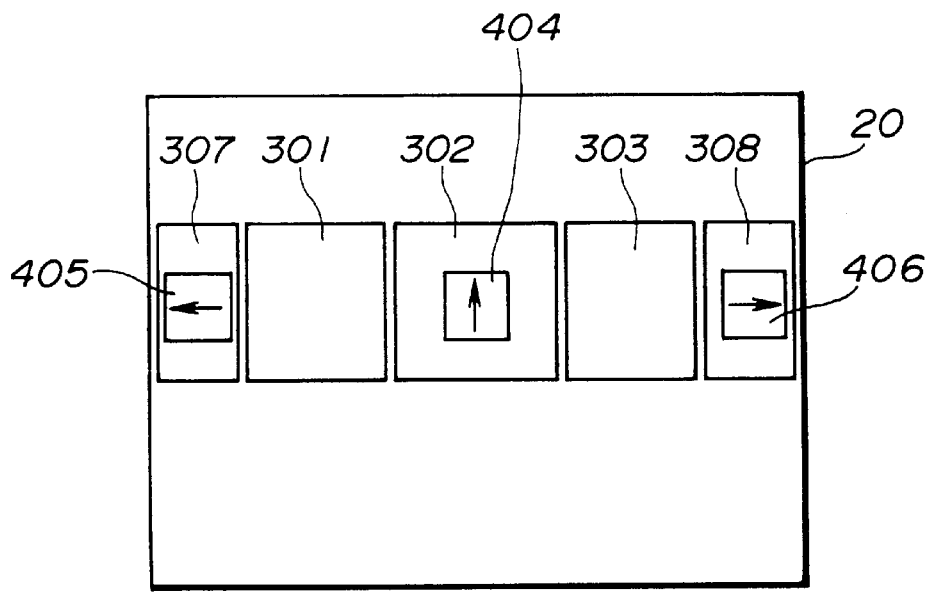
FIG. 8 shows another picture viewed by the user.

If the user clicks the left arrow pointer 402, he or she moves to a dwell point $309_2$ shown in FIG. 6. The picture seen by the user at this time is shown in FIG. 8. The user stands at a position spaced from the store 302. The line of sight of the user is directed to the store 302. Thus the user sees five stores 301, 302, 303, 307 and 308, in place of the three left side stores he or she viewed at the dwell point $309_1$. The possible movement direction at this dwell point $309_2$ is one of the directions specified by the forward arrow pointer 404, left arrow pointer 402 and the right arrow pointer 403 in the picture shown in FIG. 8. If, in the picture of FIG. 8, the user actuates the wireless mouse 31 to move the pointer and clicks the button at a position of the forward arrow pointer 404, the user moves to a dwell point $309_3$ in FIG. 6. If the user clicks the button at the left arrow pointer 405 or at the right arrow pointer 406, the user moves to dwell points $309_4$ or $309_5$ in FIG. 6, respectively.

Figure 9:
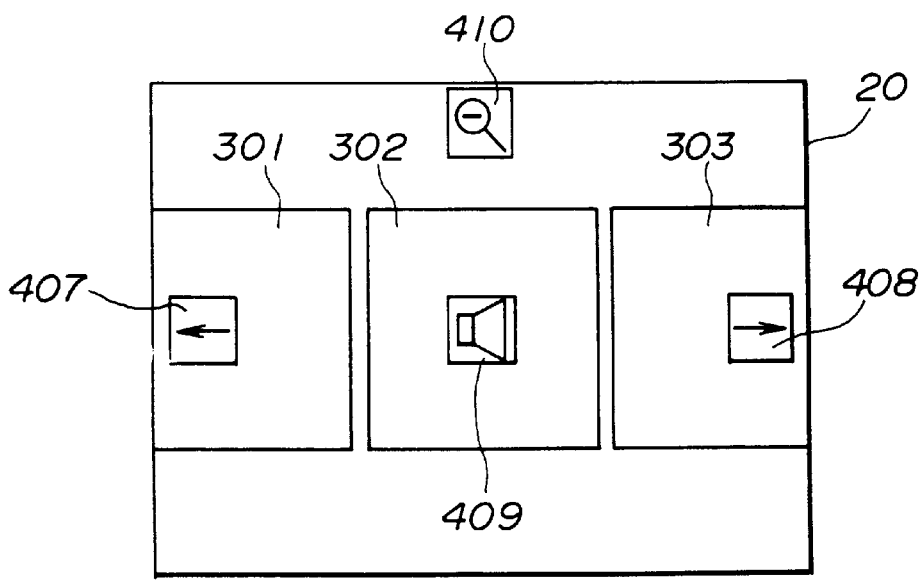
FIG. 9 shows still another picture viewed by the user.

If, in the picture of FIG. 8, the user clicks the button at the forward arrow pointer 404, moves and is halted, he or she views a picture shown in FIG. 9. The dwell point $309_3$ lies directly ahead of the store 302 so that the user sees three stores 301, 302 and 303. In this picture, the user can move the pointer to one of a pointer 409 specifying the opening of the door of the store 302, left arrow pointer 407, right arrow pointer 408 and a pointer 410 specifying the return to the position of the original dwell point $309_2$ (zoom-back) in order to click the button of the wireless mouse 31. For example, if the button is clicked at the position of the pointer 409, access may be had to the service contents of the store 302. The contents of services offered by the store 302 may be previewed automatically by characters or pictures at a time point when the pointer is moved to the position of the pointer 409.

In the above-described first embodiment, the user is free to move because of a larger number of dwell points.

A second embodiment of the operation and viewing point of the user in the three-dimensional virtual reality is now explained.

Figure 10:
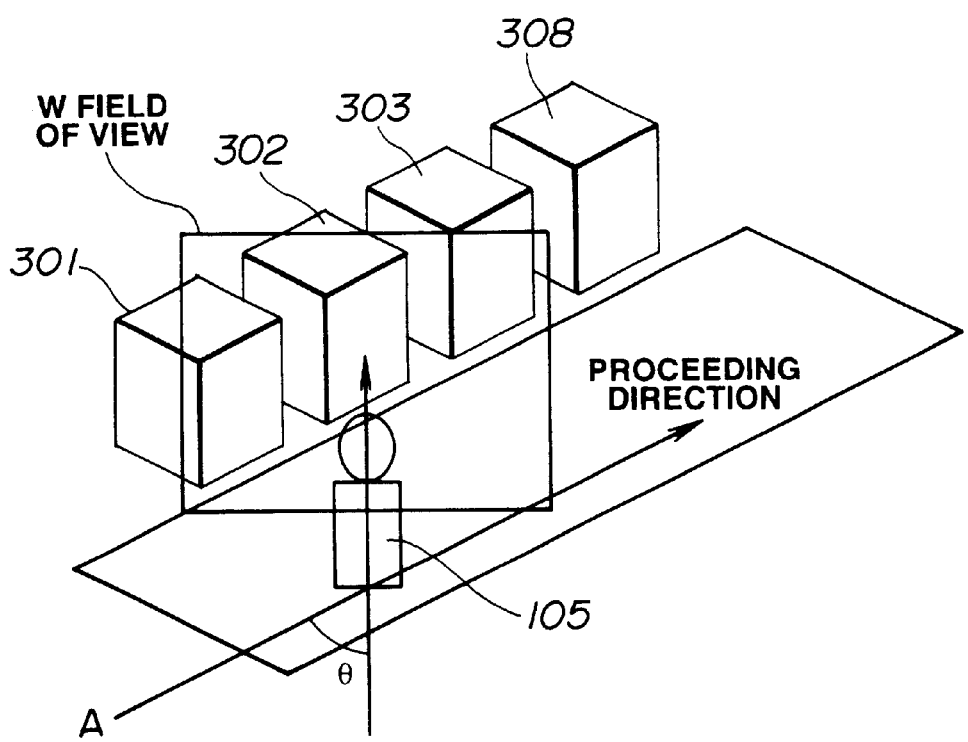
FIG. 10 illustrates a viewing point of the user.

Referring first to FIG. 10, the viewing point of the user is explained.

In the previous embodiment, the user walks straight between both rows of stores. The direction of line of sight of the user is the same as the walking direction. Conversely, while the user walks in a direction indicated by an arrow A in FIG. 10, the direction of the line of sight is not the same as the walking direction but is set at an angle θ towards one of the rows of stores. This angle θ is on the order of 30 to 60°. In the example of FIG. 10, the line of sight of the user 105 is inclined 30 to 60° towards the row of the stores 301, 302, 303 and 308, so that the user has a field of view W.

Figure 11:
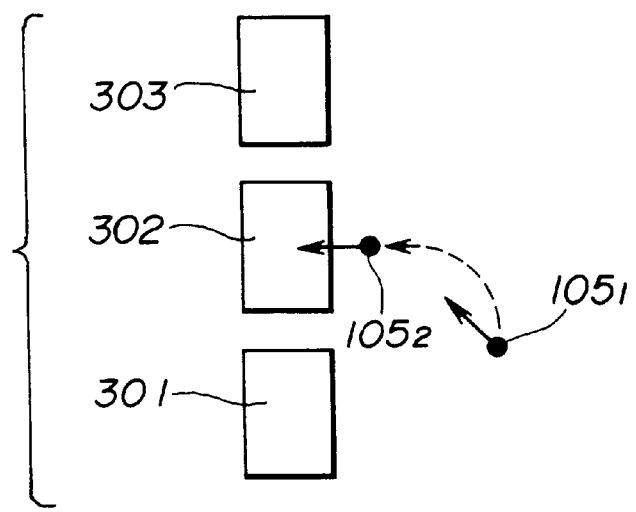
FIG. 11 illustrates a second embodiment of the user's operation and viewing point in the three-dimensional virtual reality.

FIG. 11 shows a two-dimensional picture for the row of the stores 301 to 303 as well as the operation and the line of sight of the user. The user initially is halted at the dwell point $105_1$ in FIG. 11. The directions of the line of sight and the movement operation of the user are indicated by a solid-line arrow and a broken-line arrow, respectively.

Figure 12:
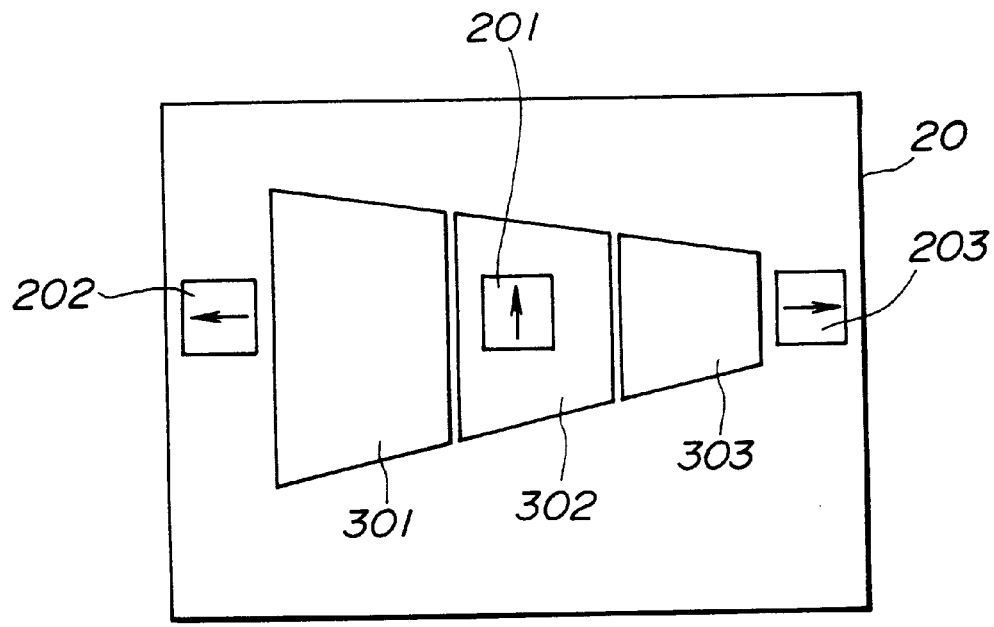
FIG. 12 shows a picture viewed by the user.

The picture the user sees at the dwell point $105_1$ is represented on the display 20 and is a picture shown in FIG. 12. The user sees the stores 301, 302 and 303.

The user moves the pointer of the wireless mouse to one of the positions indicated by the forward arrow pointer 201, left arrow pointer 202 or the store 301, right arrow pointer 203 or the store 303 and clicks the button for entering the next operation. If the button is clicked at the position of the forward arrow pointer 201, the user moves to a dwell point $105_2$ in FIG. 11. That is, the user moves automatically to a position directly ahead of the store 302, with the store 302 being at the center of the field of view. If the button is clicked at the left arrow pointer 202 or at the position of the store 301, the user moves automatically to a position directly ahead of the store 301, with the store 301 being at the center of the field of view. If the button is clicked at the right arrow pointer 203 or at the position of the store 303, the user moves automatically to a position directly ahead of the store 303, with the store 303 being at the center of the field of view.

Figure 13:
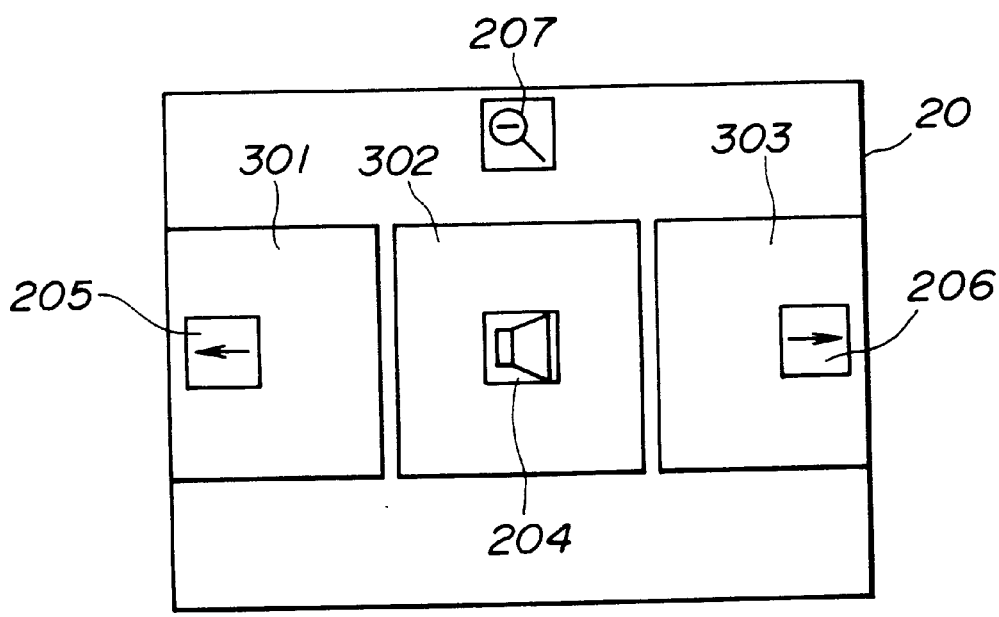
FIG. 13 shows a picture viewed by the user.

FIG. 3 shows a picture the user views at the dwell point $105_2$. The picture of FIG. 13 is the same as the picture shown in FIG. 9. Thus, with the present second embodiment, the user can move to the dwell point $105_2$ of FIG. 11, which is the same as the dwell point $309_3$ of FIG. 6, by a single movement operation.

In the picture of FIG. 13, similarly to the picture shown in FIG. 9, the pointer can be moved to one of the pointer 204 specifying the opening of the door of the store 302, left arrow pointer 205, right arrow pointer 206 and the pointer 207 specifying reversion to the position of the original dwell point $105_1$ (zoom-back) by clicking the button of the wireless mouse 31. By clicking the button at the position of the pointer 204, access may be had to the contents of services offered by the store 302. The contents of the services of the store 302 can be automatically previewed with characters or pictures at a time when the pointer has been moved to the position of the pointer 204. If the button is clicked at the position of the pointer 207 for zoom-back to the dwell point $105_1$, the direction of the line of sight, for example, is also reverted to the original state, so that the picture seen by the user is the picture shown in FIG. 12.

By setting the dwell points or pass points, in which the position information, line of sight information, speed information and the operational information, convenient for the user, have been set, as in the instant second embodiment, the user can easily judge the direction of movement, for example, in the movement operation in the three-dimensional virtual reality.

What is claimed is:

1. A picture display method for use with a pointing device and with a display device having a plurality of pre-determined selection areas, the method comprising the steps of:

displaying a three-dimensional picture on the display device;

receiving a selection of one of the pre-determined selection areas from the pointing device, wherein the selected selection area has associated therewith a stop point; and displaying the three-dimensional picture on the display device based on control information associated with the stop point.

2. The picture display method as claimed in claim 1, wherein the control information associated with the selected stop point at least includes position information representing the position in said three-dimensional space.

3. The method of claim 2 wherein upon receipt of a selection the step of displaying automatically moves from a first stop point to a second stop point wherein the second stop point is a pre-determined distance from the first stop point.

4. The picture display method as claimed in claim 1, wherein the control information associated with the selected stop point at least includes operation information representing the state of operations performed by the user at the selected stop point.

5. The method of claim 4 wherein upon receipt of a selection the step of displaying automatically moves from a first stop point to a second stop point wherein the second stop point is a pre-determined distance from the first stop point.

6. The picture display method as claimed in claim 1, wherein the control information associated with the selected stop point at least includes line of sight information representing a direction of a line of sight at the stop point.

7. The method of claim 6 wherein upon receipt of a selection the step of displaying automatically moves from a first stop point to a second stop point wherein the second stop point is a pre-determined distance from the first stop point.

8. The picture display method of claim 1, wherein upon receipt of a selection the step of displaying automatically moves from a first stop point to a second stop point wherein the second stop point is a pre-determined distance from the first stop point.

9. A computer network configured to provide graphical data to a computer and to receive requests from the computers comprising:
  a video server operationally coupled with a network and configured to provide graphical data to a computer over the network wherein the graphical data includes a plurality of viewpoints within a three-dimensional virtual reality and a plurality of discrete selection areas, wherein each of the plurality of discrete selection areas is associated with at least one of the plurality of viewpoints;
  a management server operationally coupled with the video server and the network and configured to receive requests from the computer and to provide the graphical data in response to the requests;
  a computer configured to receive the graphical data from the video server and to provide requests to the management server; and
  a network operationally coupled with the computer, the video server and the management server wherein the network transmits the graphical data and the requests.

10. The computer network of claim 9 wherein the video server and the management server reside on one host computer.

11. The computer network of claim 9, wherein the computer comprises:
  a display configured to show a picture wherein the picture is based upon a first one of the plurality of viewpoints and includes at least one of the plurality of discrete selection areas; and
  a pointing device operationally coupled with the display wherein, when the pointing device actuates one of the discrete selection areas, the display shows a picture based upon a viewpoint associated with the actuated discrete selection area, wherein the viewpoint associated with the activated discrete selection area is a pre-determined distance from the first one of the plurality of viewpoints.

12. A picture display apparatus, comprising:
  a display configured to display a three-dimensional picture;
  a pointing device configured to point to a position in the picture displayed in said display;
  a holding memory configured to store the control information of a plurality of possible stop points pre-determined in a three-dimensional space; and
  a control circuit configured to cause the three-dimensional picture to be displayed on said display based on said control information of the possible stop points in the three-dimensional space held by said holding memory, said possible stop points corresponding to positions in said picture pointed to by said pointing device, wherein selection of a first stop point by the pointing device causes the display to change from a viewpoint associated with a second stop point to a viewpoint associated with the first stop point.

13. The apparatus of claim 12 wherein the control information on the possible stop points held by said holding memory at least includes the operation information representing the state of operations performed by the user at said possible stop points.

14. The apparatus of claim 12 wherein the control information on the possible stop points held by said holding memory at least includes the line of sight information representing the direction of the line of sight at said possible stop points.

15. A picture display apparatus, comprising:
  a display configured to receive picture information;
  a control circuit operationally coupled with the display and configured to provide picture information for a virtual reality wherein the picture information includes a first viewpoint and a plurality of selection areas; and
  a selection device operationally coupled with the control circuit and configured to choose from among the plurality of selection areas wherein upon selection of one of the plurality of selection areas the picture information changes from the first viewpoint to a second viewpoint associated with the chosen selection area wherein the second viewpoint is a pre-determined distance from the first viewpoint.

16. A picture displaying method, comprising the steps of:
  providing a display for displaying a three-dimensional picture;
  providing a pointing device for pointing to a position in the picture displayed in said display;
  providing a holding memory for storing the control information of a plurality of possible stop points pre-determined in a three-dimensional space; and
  causing the three-dimensional picture to be displayed on said display based on said control information of the possible stop points in the three-dimensional space held by said holding memory, said possible stop points corresponding to positions in said picture pointed to by said pointing device, wherein selection of a first stop point by the pointing device causes the display to change from a viewpoint associated with a second stop point to a viewpoint associated with the first stop point.

17. The method of claim 16 wherein the control information on the possible stop points held by said holding memory at least includes the operation information representing the state of operations performed by the user at said possible stop points.

18. The method of claim 16 wherein the control information on the possible stop points held by said holding memory at least includes the line of sight information representing the direction of the line of sight at said possible stop points.

19. A picture displaying method, comprising the steps of:

providing a display to receive picture information;

operationally coupling a control circuit with the display, said control circuit configured to provide picture information for a virtual reality wherein the picture information includes a first viewpoint and a plurality of selection areas; and operationally coupling a selection device with the control circuit, said selection device configured to choose from among the plurality of selection areas wherein upon selection of one of the plurality of selection areas the picture information changes from the first viewpoint to a second viewpoint associated with the chosen selection area wherein the second viewpoint is a predetermined distance from the first viewpoint.

* * * * *